R. B. CRAIG & A. L. COFFMAN.
TOOL HOLDER.
APPLICATION FILED FEB. 5, 1918.
1,285,627.
Patented Nov. 26, 1918.
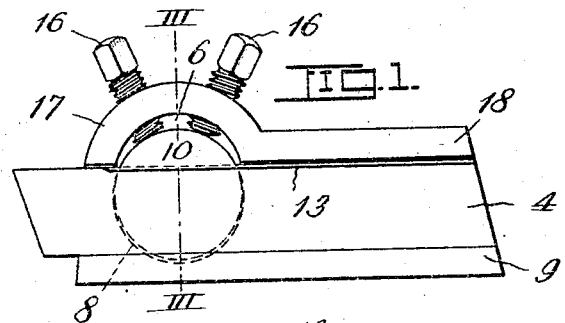
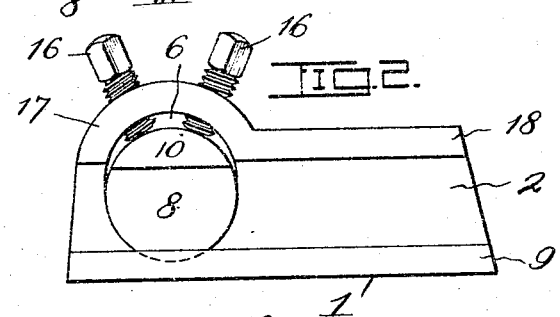
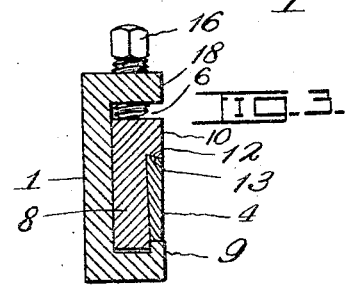
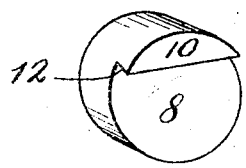
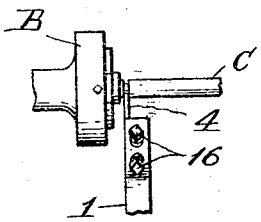
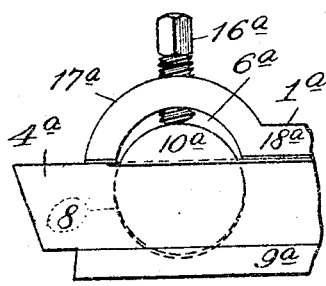
WITNESS:
Fred G. Fischer.
INVENTOR.
Robert B. Craig
and Albert L. Coffman,
BY
F. G. Fischer,
ATTORNEY.

UNITED STATES PATENT OFFICE.

ROBERT B. CRAIG, OF BRAYMER, AND ALBERT L. COFFMAN, OF KANSAS CITY, MISSOURI.

TOOL-HOLDER.

1,285,627.  Specification of Letters Patent.  Patented Nov. 26, 1918.

Application filed February 5, 1918. Serial No. 215,473.

*To all whom it may concern:*

Be it known that we, ROBERT B. CRAIG, of Braymer, Caldwell county, Missouri, and ALBERT L. COFFMAN, of Kansas City, Jackson county, Missouri, citizens of the United States, have invented certain new and useful Improvements in Tool-Holders, of which the following is a specification.

Our invention relates to tool holders of that class employed in holding tools while in use on lathes and similar machines, and one object is to provide a simple, inexpensive device of this character which will firmly and reliably hold the cutting tool in position while at work.

A further object is to provide a device of this character which is so formed that one of its sides is flush or approximately flush with one side of the tool held thereby, thus permitting said tool to be adjusted in close proximity to the lathe chuck holding the article being operated upon.

Referring now to the accompanying drawing, which illustrates the invention:

Figure 1 is a side elevation of the tool holder with a cutting tool clamped in position therein.

Fig. 2 is a side elevation of the tool holder with the cutting tool removed.

Fig. 3 is a vertical cross section, on line III—III of Fig. 1.

Fig. 4 is a detail, perspective view of a clamp member constituting an important feature of the tool holder.

Fig. 5 is a broken, plan view showing how the cutting tool may be brought into close proximity to the chuck of a lathe.

Fig. 6 is a broken, side elevation of the cutting tool and a modified form of tool holder.

In carrying out the invention, we employ a member 1, having a longitudinal groove 2 therein to receive the cutting tool 4. The depth of the groove 2 and the thickness of the cutting tool 4 are, preferably equal or approximately so, so that one side of the member 1 and one side of the cutting tool 4 will be substantially flush when said cutting tool is secured in position in the grooved portion of the member 1. This arrangement permits the tool to be brought in close proximity to the chuck B of a lathe, as disclosed by Fig. 5, for the purpose of operating on an article such as the spindle $c$ held in position by the chuck.

6 designates a recess in the forward portion of the member 1 and communicating with the groove 2 to freely receive a clamp member 8. The upper and lower portions of the recess 6 extend above and below the respective portions of the groove 2, thus the flange 9 at the bottom of said groove 2 overlaps the face of the clamp member 8 and tends to retain said clamp member in the recess 6. The face portion of the clamp member 8 is provided at its upper portion with a shoulder 10 having a beveled undersurface 12 for engagement with the corresponding surface 13 of the cutting tool 4. By thus beveling the shoulder 10 and the cutting tool 4, all tendency of the latter to spring laterally out of the groove is effectually overcome.

The clamp member 8 is forced downwardly, so that its shoulder 10 may firmly engage the cutting tool 4, by a pair of adjusting-members 16, preferably, in the form of set screws, threaded through the arched portion 17 of a flange 18 projecting over the upper portion of the tool 4 and the clamp member 8, as more clearly disclosed by Fig. 3.

In the modified form disclosed by Fig. 6, the construction and arrangement of parts are similar to those of the preferred form, as indicated by corresponding reference numerals, the only difference being that but one set screw is employed instead of two.

From the foregoing description, it is apparent that we have produced a tool holder simple in construction and operation, and while we have shown the preferred form of our invention, with a slight modification thereof, we reserve the right to make such other modifications as properly fall within the spirit and scope of the claims.

Having thus described our invention, what we claim and desire to secure by Letters Patent, is:

1. A device of the character described, consisting of a member having a groove in one side thereof to receive a cutting tool and a recess communicating with the groove and extending above and below the same, a clamp element fitting loosely within the recess and adapted to coact with one edge of the groove in holding the cutting tool in position, and set-screws threaded in the member and adapted to force said clamp element firmly into engagement with the cutting tool.

2. In combination, a member having a longitudinal groove in one side thereof, a cutting tool removably-fitting within the groove and having one side flush with one side of the member, a clamp element having a shoulder with a beveled under edge to engage the beveled upper edge of the cutting tool, and a set-screw threaded into the member and adapted to force the clamp element firmly into engagement with the cutting tool.

In testimony whereof we affix our signatures, in the presence of two witnesses.

ROBERT B. CRAIG.
ALBERT L. COFFMAN.

Witnesses:
F. G. FISCHER,
L. J. FISCHER.

Copies of this patent may be obtained for five cents each, by addressing the "Commissioner of Patents, Washington, D. C."